No. 645,497. Patented Mar. 13, 1900.
H. STOMMEL.
MOTOR VEHICLE.
(Application filed Aug. 5, 1898. Renewed Aug. 22, 1899.)
(No Model.) 2 Sheets—Sheet 1.
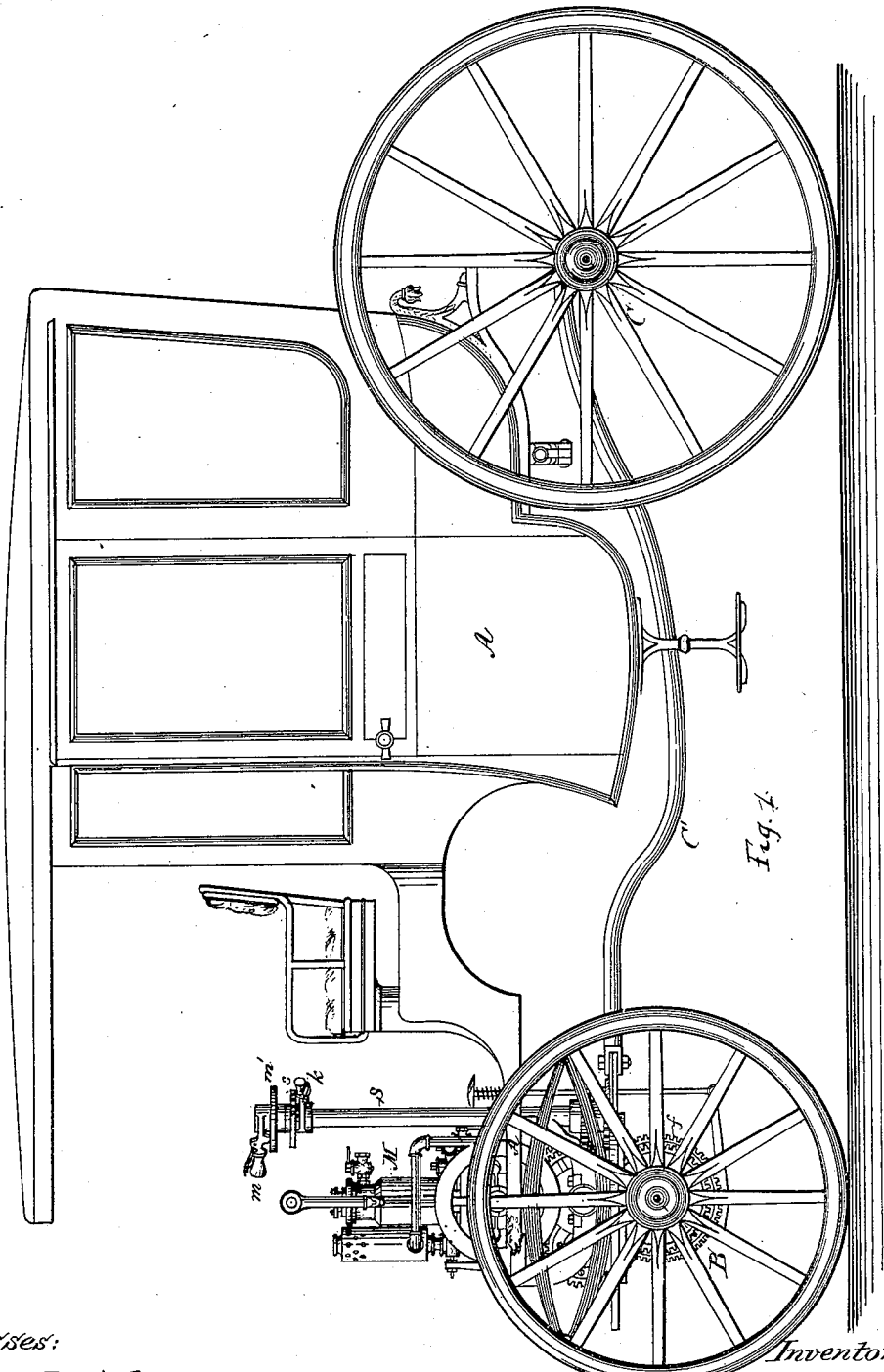
Witnesses:
Geo. W. Tinkins
James M. Woodward
Inventor:
Hugo Stommel,
By T. C. Brecht,
Attorney.

No. 645,497. Patented Mar. 13, 1900.
H. STOMMEL.
MOTOR VEHICLE.
(Application filed Aug. 5, 1898. Renewed Aug. 22, 1899.)
(No Model.) 2 Sheets—Sheet 2.
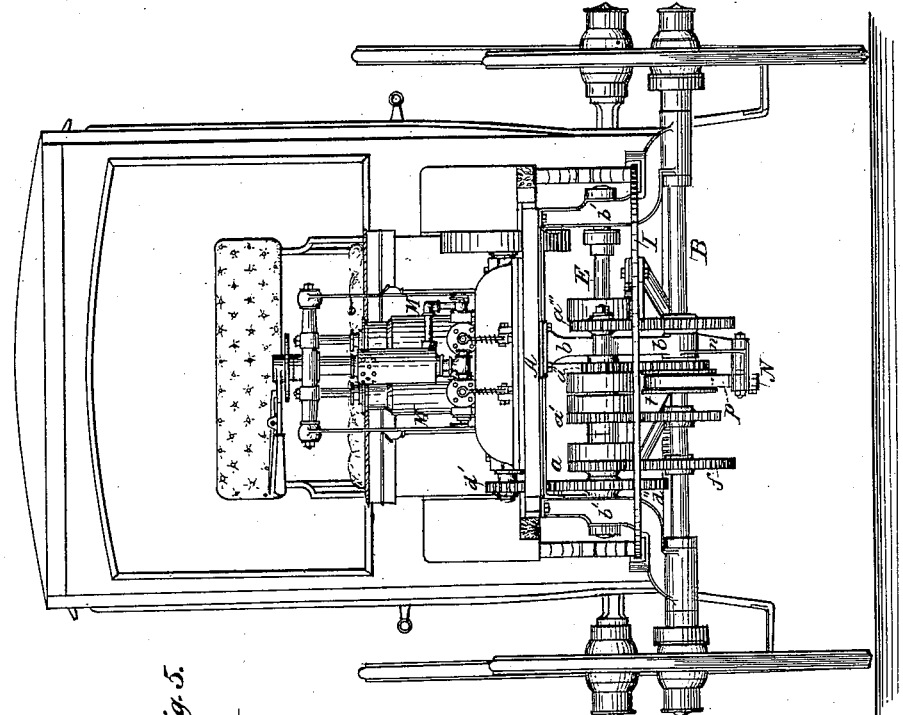
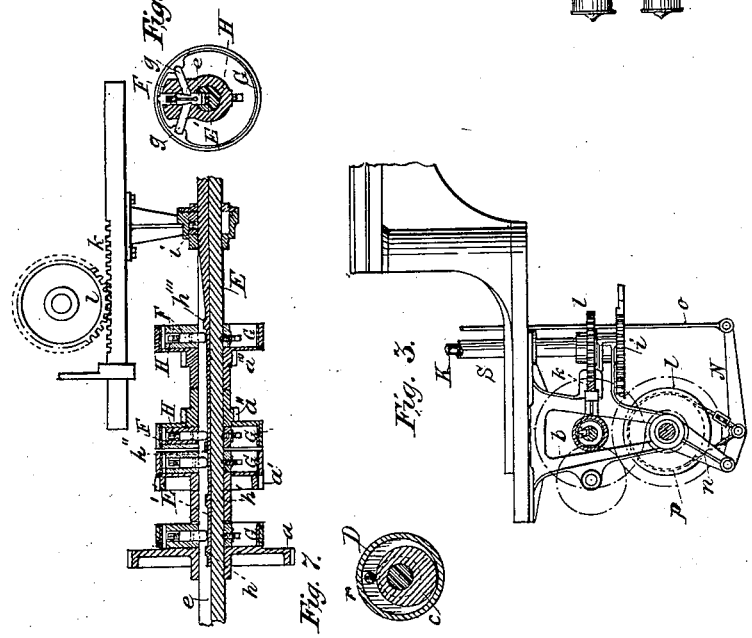
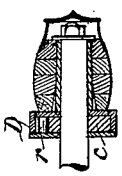
Witnesses:
Geo. W. Linkins
James M. Woodward
Inventor:
Hugo Stommel,
By T. C. Brecht
Attorney.
THE NORRIS PETERS CO., PHOTO-LITHO., WASHINGTON, D. C.

UNITED STATES PATENT OFFICE.

HUGO STOMMEL, OF PLAINFIELD, NEW JERSEY, ASSIGNOR TO THE UNITED STATES STANDARD MOTOR VEHICLE COMPANY, OF NEW JERSEY.

MOTOR-VEHICLE.

SPECIFICATION forming part of Letters Patent No. 645,497, dated March 13, 1900.

Application filed August 5, 1898. Renewed August 22, 1899. Serial No. 728,134. (No model.)

*To all whom it may concern:*

Be it known that I, HUGO STOMMEL, a citizen of the United States, residing at Plainfield, in the county of Somerset and State of New Jersey, have invented certain new and useful Improvements in Motor-Vehicles, of which the following is a specification.

My invention relates to improvements in motor-vehicles or horseless wagons. As is well known, in vehicles of this class much inconvenience has been experienced in finding the proper position or place for placing the machinery—the engine or the gearing—and in most cases it was found necessary to place them under the body of the wagon. In many cases the bodies of the wagons are so low that it is hard to adjust the machinery, and it could not be properly examined, repaired, cleaned, or oiled when required. Furthermore, dust, sand, &c., settled in the mechanisms and prevented the proper working of the same. Another great inconvenience, and perhaps the worst, is that the operator is unable to observe the engine when placed under the wagon.

To overcome these objections is the object of my invention and to apply it easily to old wagons, no matter what their form and without making changes on the same; also, to obviate unnecessary friction and loss of power, and, finally, to have the engine and machinery in plain sight and easy of access.

My invention consists in the peculiar construction of details and the novel arrangement of parts, as will be more fully described hereinafter and specifically pointed out in the claims, reference being had to the accompanying drawings and the letters thereon.

Like letters indicate similar parts in the different figures of the drawings, in which—

Figure 1 represents a side elevation of the improved motor vehicle or wagon. Fig. 2 is a front elevation of the same. Fig. 3 is a detail view of part of the front platform, partly in section, showing certain details. Figs. 4, 5, 6, and 7 are details of the operating mechanism.

In the drawings, A is the main frame or body and having the front axle B and the rear axle C attached to it. These axles are connected by a longitudinal bar C', which at the front end has an eye or hinge joint, so that the front axle and wheels can move at an angle. The front axle is made in two parts and at the center is supported in the bracket $b$, secured to the frame. Above the front axle is journaled a counter-shaft E, supported in friction-roller bearings in the brackets $b\ b'\ b''$. This counter-shaft E is provided with a longitudinal groove $e$, in which a flat steel rod E' can slide. This rod is provided with three projections $h\ h'\ h''$ and at its one end has a pin with friction-roller $i$. This pin and roller can freely revolve in the shifter, provided with an enlarged bore to allow said rod, with pin and roller, to revolve. The shifter is stationary and is connected by a rack $k$, movable in guides on the bracket $b$. The rack meshes with a gear-wheel $l$, secured to a vertical shaft or pillar S, extending upward above the platform, and is provided with a handlever $m$ with a projection that engages with a notch in the disk $m'$ to keep it in place.

The counter-shaft E carries the driving gear-wheel $a\ a'\ a''\ a'''$, and each of these gears has secured to it a spring friction-clutch. These consist of a hollow drum, attached to the gears, and a collar H, secured to the shaft. In this drum are placed two dogs $g\ g$ in a notch on the circular spring G, that is cut at one side. The drum acts the same as a loose pulley on the shaft E. The collar has at its upper side a sliding piece F, that extends into the groove in the shaft and rests on the steel rod E'. Said piece F is provided with two notches, against which the dogs $g\ g$ brace themselves and act against the spring $h$, and when acted on by either of the projections $h\ h'\ h''$ is brought into action. By moving the rod with the projection $h$ between the piece F and the shaft E said piece will be pushed outward and the dogs will act (similar to a toggle-joint) with great force upon the spring and connect it by means of frictional contact to the inner side of the drum, which, being connected to the driving-gear $d'$, will drive the gear-wheel $f$ on the axle B. By continuing to push the rod between the next respective clutch it will be acted on in a similar manner, and as the gears are of different sizes of pinions and wheels the speed will be changed. By pulling the steel rod backward until the projection $h'''$ acts on the wheel $a'''$ the motion of the vehicle will be reversed by reversing the motion of the motive power.

Close to the hubs of the front wheels are attached the compensating clutches D D, as shown in Figs. 6 and 7. These consist of an eccentric $c$, inclosed in the hollow drum D, fastened to the hubs of said wheels and the steel antifriction-roller $r$. In turning corners the steel roller in the outer wheel will fall back and will permit the wheel to run ahead, and when the wagon resumes a straight course both of the rollers will become clamped between the eccentric and the inner side of the drum, and the wheel will revolve again.

Close above the front axle is placed the circular fifth-wheel I, which is secured in lugs on the brackets $b'\,b''$. The fifth-wheel is stationary and is made of flat iron. It is provided with internal gear-teeth, with which the gear-wheel $i$ meshes. This wheel $i$ is operated by a shaft K, to which it is secured. Said shaft passes through the hollow shaft or pillar S and is provided at its upper end with a wheel or disk $s$, having a notch or hole, with which a pin or projection on a hand-lever $k$ engages, and it is manipulated by it, and the vehicle is thus steered or guided, as desired.

The motive power, preferably a gas-engine M, is placed on the front platform, and the gear $d'$ imparts motion to the wheel $d''$ on the counter-shaft, and thus to the wheels $a\,a'\,a''\,a'''$ on the counter-shaft, and imparts motion to front axle, as desired.

Close to the central bracket $b$ a flanged drum $t$ is secured to the front axle, and around it fits a steel band $p$, with eyes at each of its lower ends, by which it is attached to a pivoted lever N, that is attached with one end to an arm or lug $n$ on the bracket $b$, while the other end of said lever is connected to a vertical rod $o$, extending above the platform, and can be manipulated by the driver, as desired, to act as a brake.

The gasolene or other motive agent can be placed under the seat of the driver or wherever else desired. A supply of water can also be carried in the extensions on each side of the vehicle.

It will be readily seen that the engine and all the operating parts of this vehicle are arranged over the front axle and can be readily manipulated by the driver or operator; also, that it is all in plain sight and under his supervision, as well as easily accessible for oiling, repairing, or other needed requirements.

It can be produced at a moderate expense, and the cost of its operation is much less than required with horses.

Having thus described my invention, what I claim is—

1. In motor-vehicles, the combination of a counter-shaft having friction-drum gears for varying the speed by a shifter as described, with a compensating clutch consisting of a drum and eccentric with a friction-roller, all arranged as and for the purpose set forth.

2. In motor-vehicles the counter-shaft E, provided with the gear-wheels $a, a', a''$, having friction-drums, in which are placed circular springs G, that are operated by a sliding piece F and pivoted dogs $g$, $g$ and by means of a sliding rod E', having projections $h$, $h'$, $h''$, in combination with a gear-wheel $a'''$ and a projection $h'''$ for reversing the action of the vehicle, as specified.

3. In motor-vehicles, a friction-clutch consisting of a drum containing a spring that is acted on by a collar secured to the shaft, and provided with a sliding piece actuating the pivoted dogs against said spring and operated as a toggle-joint in the manner shown and specified.

4. In motor-vehicles, the combination of a front axle with a counter-shaft provided with friction-drum gears, meshing with gears on said axle, and operated by a sliding shifter, having projections, in combination with a sliding piece in a collar secured to the shaft and provided with dogs and a spring, as and for the purpose set forth.

5. In a motor-vehicle, the combination of a fifth-wheel and a gear meshing therewith and operated by a handle with catch on a vertical shaft, with the compensating clutch, consisting of a drum containing an eccentric and friction-roller, all arranged as shown and specified.

6. The motor-vehicle described, consisting of an engine, connected by gearing to a counter-shaft, having friction-drum gears, the front axle having wheels, provided with compensating clutch consisting of a drum containing an eccentric and friction-roller, in combination with a fifth-wheel and gear, all arranged and operated as shown and set forth.

In testimony whereof I affix my signature in presence of two witnesses.

HUGO STOMMEL.

Witnesses:
 GEO. W. LINKINS,
 JAMES M. WOODWARD.